US008234001B2

(12) United States Patent
Rice et al.

(10) Patent No.: US 8,234,001 B2
(45) Date of Patent: Jul. 31, 2012

(54) TOOL COMMONALITY AND STRATIFICATION ANALYSIS TO ENHANCE A PRODUCTION PROCESS

(75) Inventors: James Rice, Hopewell Junction, NY (US); Dustin K. Slisher, Hopewell Junction, NY (US); Yunsheng Song, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/568,083

(22) Filed: Sep. 28, 2009

(65) Prior Publication Data
US 2011/0077765 A1   Mar. 31, 2011

(51) Int. Cl.
G06F 19/00   (2011.01)
(52) U.S. Cl. ........... 700/110; 700/109; 702/84; 702/185
(58) Field of Classification Search .................. 700/110, 700/109, 108, 111, 121, 175; 702/81, 84, 702/183, 185
See application file for complete search history.

(56) References Cited

U.S. PATENT DOCUMENTS

| 6,041,267 | A | 3/2000 | Dangat et al. |
| 6,321,369 | B1 | 11/2001 | Heile et al. |
| 6,580,960 | B1 * | 6/2003 | Nicholson ..................... 700/121 |
| 6,594,589 | B1 | 7/2003 | Coss, Jr. et al. |
| 6,701,204 | B1 * | 3/2004 | Nicholson ..................... 700/121 |
| 6,757,668 | B1 | 6/2004 | Goebel et al. |
| 6,775,825 | B1 | 8/2004 | Grumann et al. |
| 6,970,758 | B1 | 11/2005 | Shi et al. |
| 6,975,916 | B2 * | 12/2005 | Kuo .............................. 700/121 |
| 7,430,725 | B2 | 9/2008 | Broberg, III et al. |
| 7,478,019 | B2 | 1/2009 | Zangooie et al. |
| 7,502,658 | B1 * | 3/2009 | Barbee et al. ................. 700/109 |
| 2003/0182252 | A1 * | 9/2003 | Beinglass et al. ............... 706/45 |

FOREIGN PATENT DOCUMENTS

| JP | 63011257 A | 1/1988 |
| JP | 05285802 A | 11/1993 |
| WO | 2008/131028 A3 | 10/2008 |

OTHER PUBLICATIONS

Yang Liu, "Predictive Modeling for Intelligent Maintenance in Complex Semiconductor Manufacturing Process", 2008, 167 pgs, University of Michigan (Doctoral Thesis).

* cited by examiner

Primary Examiner — John R. Cottingham
Assistant Examiner — Steven Garland
(74) Attorney, Agent, or Firm — Cantor Colburn LLP; Ian MacKinnon

(57) ABSTRACT

A method of analyzing production steps includes inputting application data associated with a production process having a plurality of process steps into a memory with each of the plurality of process steps including a plurality of tools. The method also includes loading process data associated with one of the plurality of process steps into the memory, performing a tool commonality analysis on each of the tools associated with the at least one of the plurality of process steps, identifying all tool-to-tool differences for the at least one of the plurality of process steps, performing a tool stratification analysis to identify one of the plurality of tools that provides the largest variance contribution to the at least one of the plurality of process steps, and stopping the one of the plurality of tools that provides the largest variance contribution to the at least one of the plurality of process steps.

20 Claims, 6 Drawing Sheets

TOOL COMMONALITY AND STRATIFICATION ANALYSIS TO ENHANCE A PRODUCTION PROCESS

BACKGROUND

The present invention relates to the art of manufacturing and, more particularly, to a system for analyzing process steps of a production process.

During production, certain process or tools may have an impact on product quality and yield. That is, many manufactured goods rely on a series of carefully designed process steps utilizing one or more tools. During fabrication, it is critical to identify which tools and/or process steps have a negative impact on product performance. Presently, tools are analyzed using an analysis of variance (ANOVA) model. The ANOVA model ranks processes having significant tool-to-tool differences. While effective, ANOVA cannot identify a tool within a process that has a very large variance or a significantly different mean that hides signals for other tools in the process. In addition, often times a problem with one tool will mask problems in other associated processes. That is, a tool having a high variance or mean shift might mask a tool having a lower variance or mean shift in another process. The ANOVA method cannot identify tools that contribute to product variance or other production parameters in other processes.

SUMMARY

According to one embodiment of the present invention, a method of analyzing production steps to enhance a production process includes inputting application data associated with at least one production process having a plurality of production steps into a memory portion of a computer with each of the plurality of process steps including a plurality of tools. The method may also include loading process data associated with at least one of the plurality of process steps into the memory portion, performing a tool commonality analysis on each of the plurality of tools associated with the at least one of the plurality of process steps, identifying all tool-to-tool differences for the at least one of the plurality of process steps, performing a tool stratification analysis to identify at least one of the plurality of tools provides the largest variance contribution to the at least one of the plurality of process steps, and stopping the one of the plurality of tools that provides the largest variance contribution to the at least one of the plurality of process steps.

System and computer program products are also described and claimed herein.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Most production/manufacturing processes include multiple steps that are carried out in sequence to produce a product. Often times, each step includes multiple tools that contribute to the manufacture of the product. During production, each tool may contribute to an over-all variance from a desired quality or yield goal. Contribution to variance includes a mean of a single tool being far away from a population mean for a particular process step(s), or variance of a single tool that is much larger than other tools in the same process step. Currently, methods exist to rank process steps that have a significant tool-to-tool difference. These methods however have at least two distinct disadvantages. First, within a single process step, if a parameter from the population related to one tool has a very large variance, or a significantly different mean compared to other tools, the noise from this worst tool may hide signals from second or third worst tools. Secondly, across multiple process steps, if a parameter from the population related to one tool in a given step has a very large variance, or significantly different mean compared to the entire population of tools, the noise from this worst tool may hide signals for the second or third worst tools from another process step(s). That is, multiple process steps may have an impact on functional yield and device performance.

As will be detailed more fully below, tool stratification analysis, in accordance with the exemplary embodiment, identifies a tool(s) which has the largest contribution of variance to a process step. In addition, the exemplary embodiment identifies a tool which has the largest contribution of variance across multiple process steps in order to enhance production. Once identified, the tools are stopped so that any necessary adjustments/repairs can be made.

Figure 1:
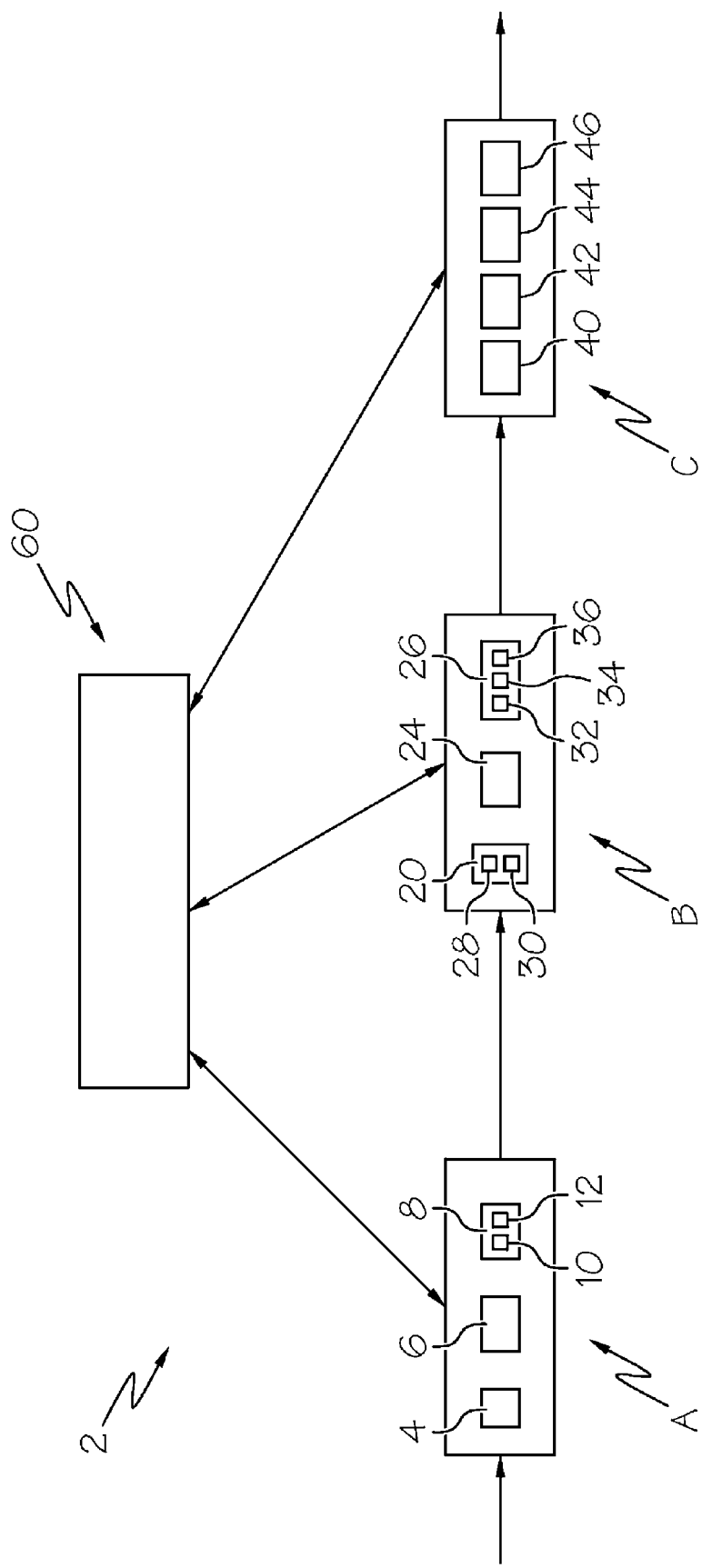
FIG. 1 is a block diagram illustrating a production process in accordance with an exemplary embodiment.

With reference now to FIG. 1 a production process 2 in accordance with an exemplary embodiment is illustrated generally at 2. Production process 2 includes multiple process steps A, B, and C. Each process step A, B, C includes multiple process tools. Process step A includes tools 4, 6, and 8 with tool 8 including two tool components 10 and 12. Process step B includes tools 20, 24 and 26 with tool 20 including two tool components 28 and 30, and tool 26 including three tool components 32, 34, and 36. Finally, process step C includes tools 40, 42, 44 and 46. Production process 2 can be employed in a variety of industries including the production of semiconductor wafers. In accordance with the exemplary embodiment, process 2 further includes a process command and control system 60 that is linked to each process step A, B, and C. Command and control system 60 is configured and disposed to analyze production process 2 to identify and stop a tool(s) that has a high contribution to variance.

Figure 2:
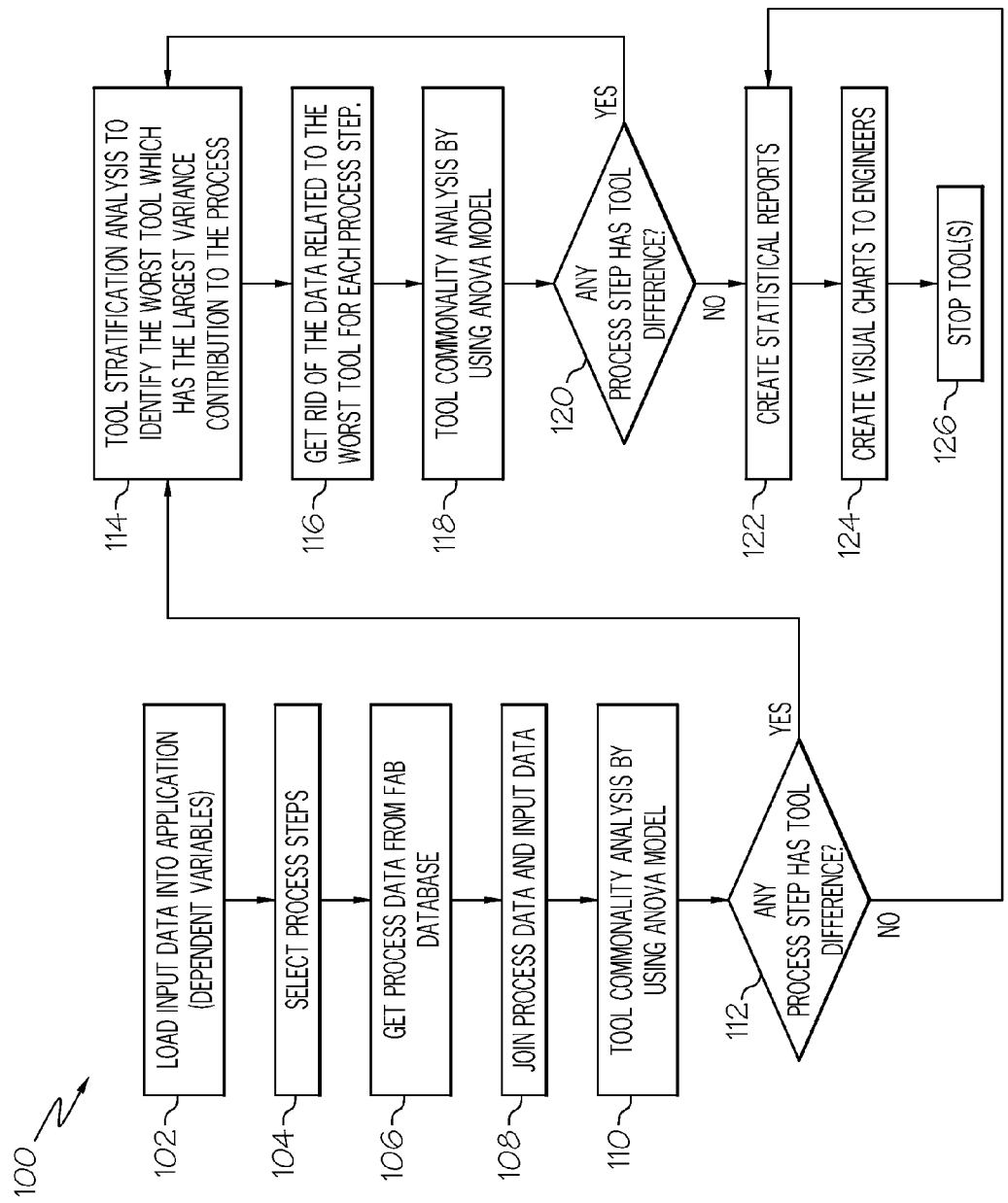
FIG. 2 is a flow chart illustrating a method of analyzing a process step of the production process of FIG. 1.

Reference will now be made to FIG. 2 in describing a method 100 of analyzing a process step in production process 2. Prior to analyzing a process step, input data is loaded into command and control system 60. Input data includes, for example, functional yield data, performance data and/or defect data, and the like as indicated in block 102. At this point, process ID groups, for example, tool data from step A, B, and C are selected as indicated in block 104. Process data for the selected process step is obtained from a FAB database as indicated in block 106. The process data from the FAB database and application data input in block 102 are merged as indicated in block 108. The merged data is employed to perform a tool commonality analysis using an analysis of variance (ANOVA) model as indicated in block 110.

Following the commonality analysis, tool differences are identified as indicated in block 112. If tool differences exist, a tool stratification analysis, to identify the worst tool, or the tool that has the largest variance contribution to the selected process step, is performed as indicated in block 114. After performing the tool stratification analysis, data associated with the worst tool is removed for the selected process step as indicated in block 116. After removing the data associated with the worst tool, the tool commonality analysis using the ANOVA model is once again performed in block 118 to identify whether tool differences still exist. In block 120 a determination is made whether tool any differences remain. If tool differences still exist, tool stratification analysis is performed once again as indicated in block 114. The data associated with the worst tool is removed as indicated in block 116 and commonality analysis is performed once again in block 118 to detect the second and/or third worst tools. Once no tool differences exist, statistical reports are created in block 122 and visual charts are created in block 124. Finally, the worst tool is stopped in block 126. After stopping the worst tool, adjustments and/or maintenance can be performed on the tool in order to enhance the tool's production contribution. In addition, if no tool differences exist in block 112, there is no need to perform a tool stratification analysis and the process jumps to create block 122 to create the statistical reports and visual charts for engineers in block 124. As no tool differences exist, no tools will be stopped in block 126.

Figure 3:
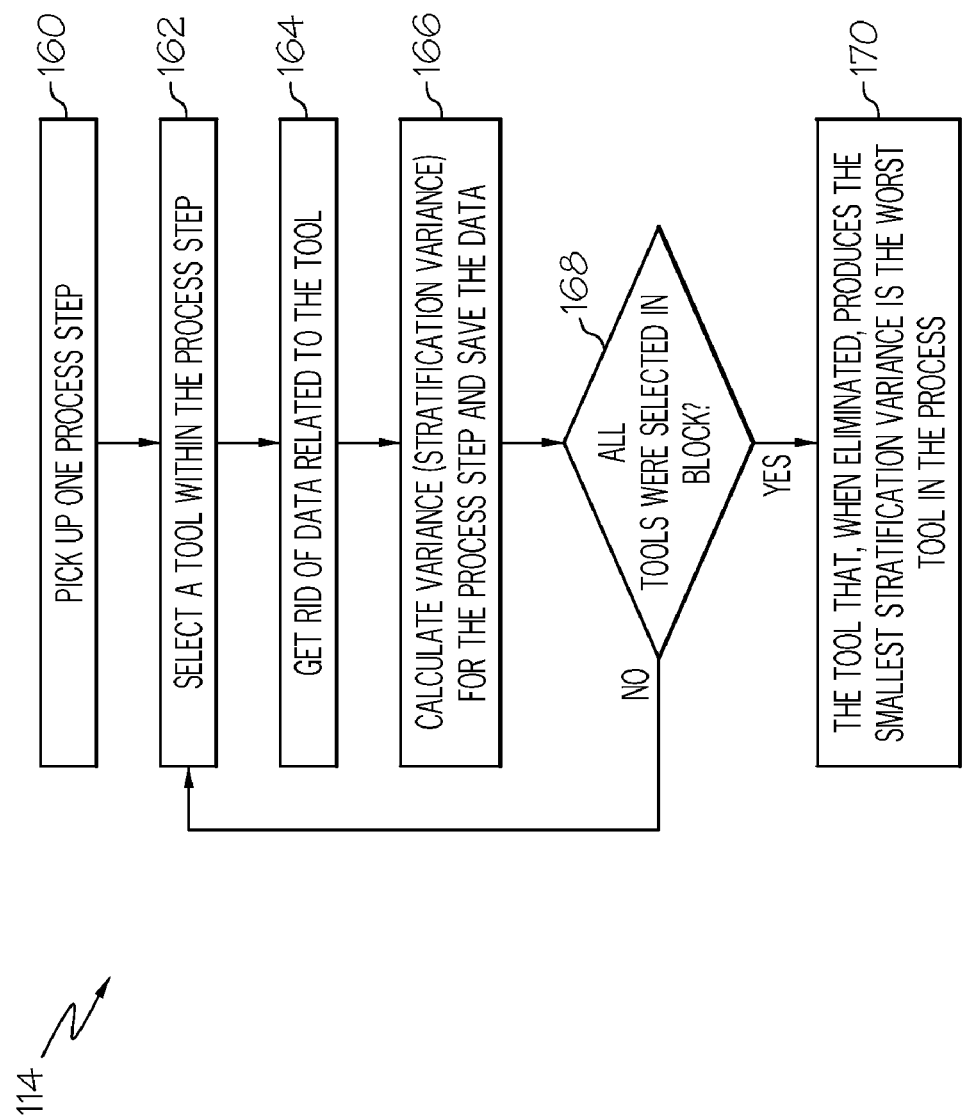
FIG. 3 is a flow chart illustrating a method of performing a tool stratification analysis employed by the method of FIG. 2.

Reference will now be made to FIG. 3 in describing the process for performing tool stratification analysis in block 114 of method 100. As shown, a process step is selected in block 160. A tool, for example tool 4 in process step A, is selected in block 162. Data associated with the tool selected in block 162 is removed from an analysis model in block 164. At this point, variance is calculated using data associated with the remaining tools in the process step as indicated in block 166. A determination is then made whether all tools are selected in block 168. That is, a determination is made whether the tool stratification analysis has been performed for each tool in a particular process step. For example, in process step A, tool 4 may be the first tool eliminated and variance calculated for tools 6 and 8. After eliminating tool 4, tool 6 is eliminated and variance is calculated for tools 4 and 8; after which tool 8 would be eliminated and variance calculated for tools 4 and 6. After all tools are eliminated and the variance calculated for each permutation of tools within the process step, a determination is made as to which tool is the worst tool in the particular process step in block 170. The worst tool is defined as the tool that, when eliminated, results in the smallest stratification variance. More specifically, each stratification variance calculated in block 166 is ranked from smallest to largest, with the smallest variance designating the removal of the worst tool in block 164.

Figure 4:
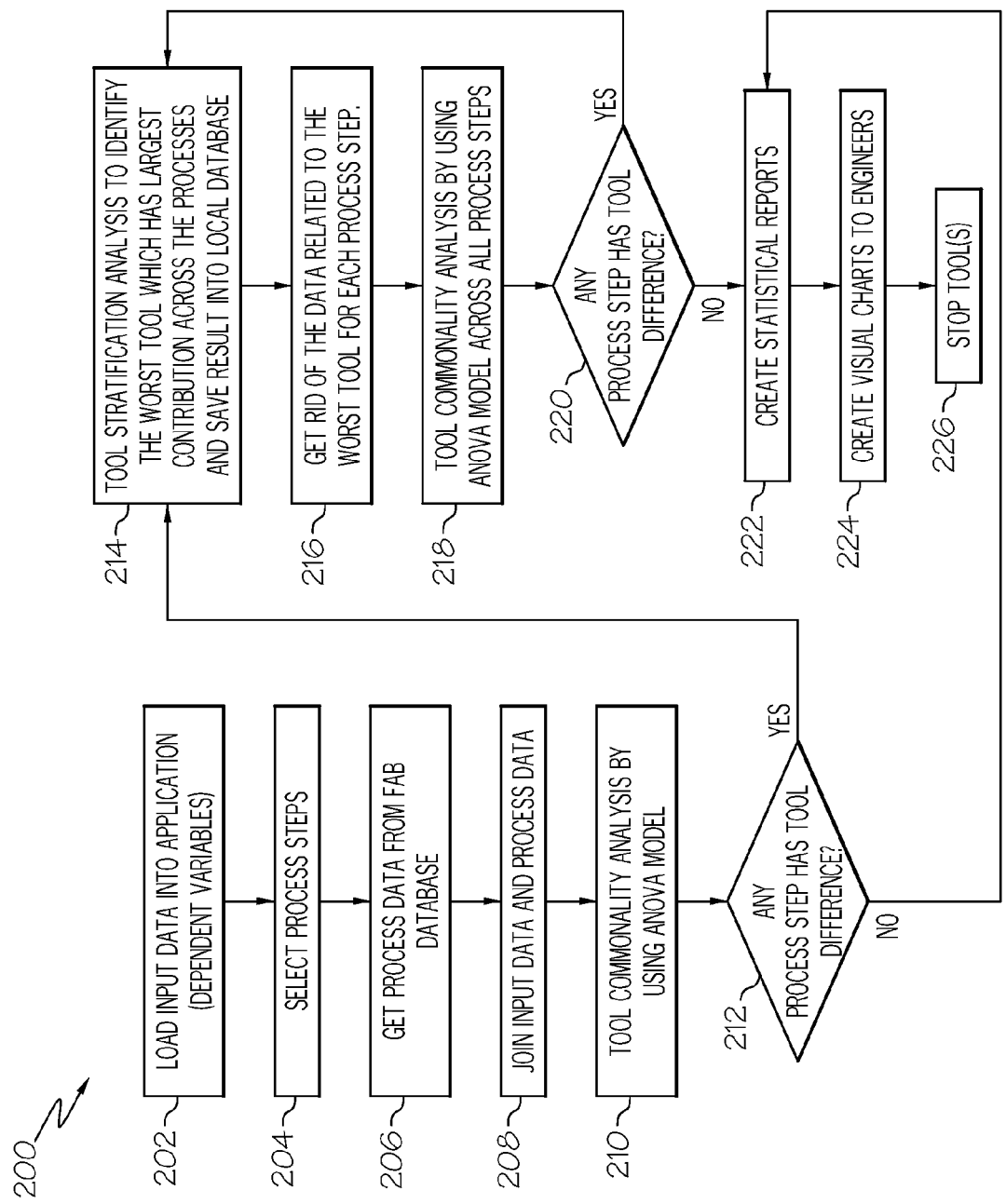
FIG. 4 is a flow chart illustrating a method of analyzing multiple process steps of the production process of FIG. 1.

Reference will now be made to FIG. 4 in describing a method 200 for analyzing across process steps in production process 2. In a manner similar to that described above, data associated with process 2, e.g. input variables such as functional yield, device performance or defect density are loaded into command and control system 60 in block 202. At this point, multiple process steps are selected in block 204. After selecting the process steps in block 204, data associated with each particular process step is obtained from the FAB database in block 206. The input data and the data associated with the process are joined in block 208, and a tool commonality analysis using an ANOVA model is performed in block 210. In block 212, a determination is made whether any tool differences are present within a particular process step after which a tool stratification analysis is performed in block 214. After performing the tool stratification analysis, data associated with the worst tool from all of the process steps is eliminated in block 216 and tool commonality analysis is performed in block 218. In block 220, a determination is made whether the process step contains additional tool differences. If so, the tool stratification analysis in block 214 is performed again in order to identify the second and/or third worst tools. If no tool differences exist, statistical reports are created in block 222 and visual charts for engineers in block 224. Finally, the worst tool across all processes is stopped in block 226 and adjustments and/or maintenance can be performed in order to return the particular tool back to a process ready state.

Figure 5:
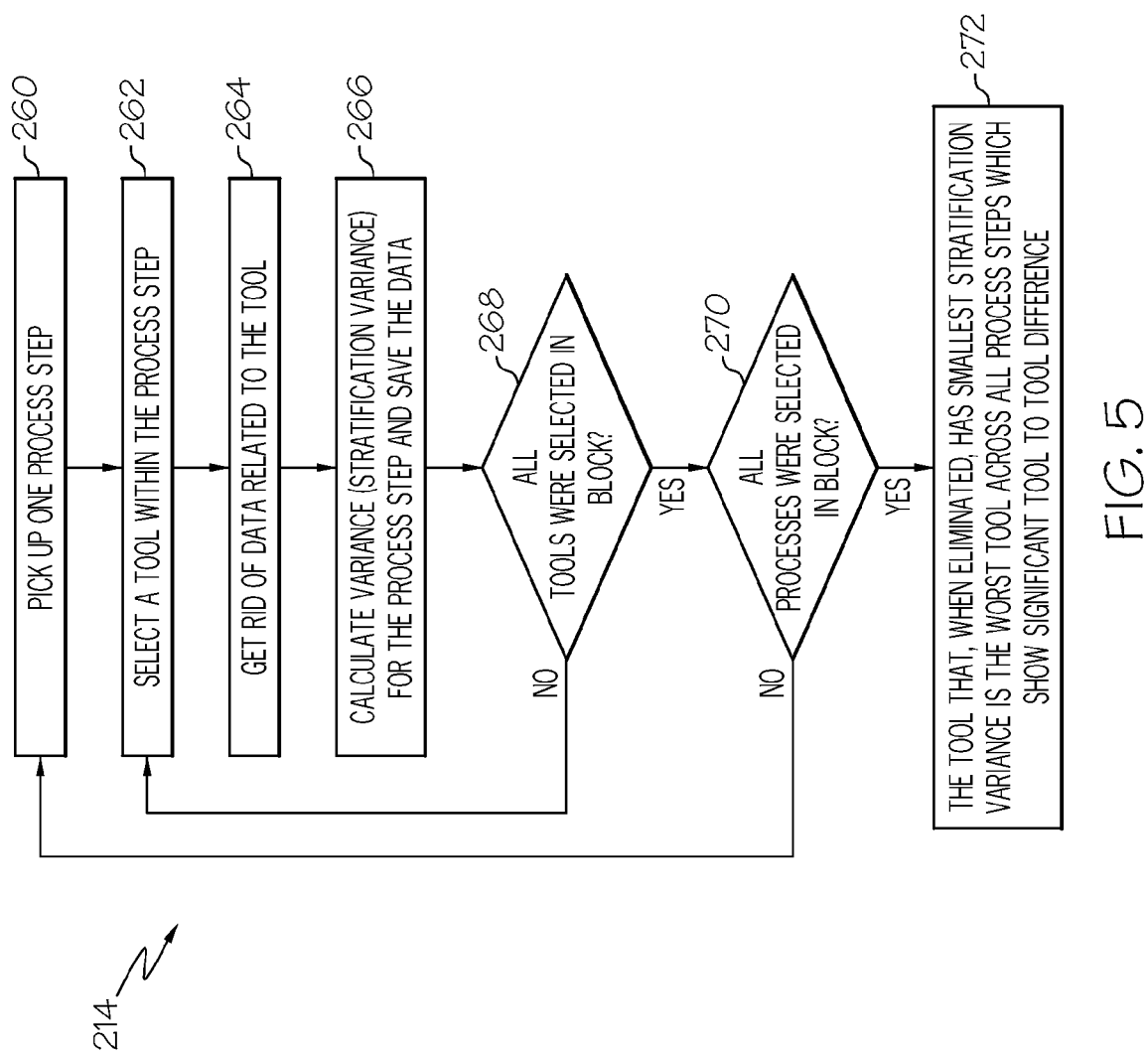
FIG. 5 is a flow chart illustrating a method of performing a tool stratification analysis employed by the method of FIG. 4.

Reference will now be made to FIG. 5 in describing a method of performing the tool stratification analysis across process steps employed by block 214 of method 200. Initially a single process step, step A, B or C is selected block 260. At this point, a tool within the particular process step, for example, tool 4 within step A, is selected in block 262. Data associated with tool 4 is removed in block 264 and a variance calculated for the remaining tools, e.g., tools 6 and 8 in block 266. At this point, a determination is made in block 268 whether all tools were selected in block 262. That is, in a manner similar to that described above, a variance is calculated for tools 6 and 8 after removing tool 4; after the removal of tool 6, variance is calculated for tools 4 and 8; and after the removal of tool 8, variance is calculated for tools 4 and 6.

After ensuring that a variance is calculated for each permutation of tools in block 262, a determination is made whether all process steps were selected in block 270. More specifically, after performing a variance calculation for each tool, 4, 6 and 8 in step A, similar calculations are made for tools 20, 24 and 26 in process step B, and tools 40, 42, 44 and 46 in process step C. After performing a variance calculation for each permutation of tools in each process step, the worst tool is identified in block 272. More specifically, the worst tool is designated as the tool that has the smallest stratification variance across all process steps that show significant tool-to-tool differences. That is, by eliminating the worst tool, variance of the remaining tools should be the smallest. In this manner, the worst tool(s) of all processes can be stopped for a maintenance operation to return the process to within acceptable variance limits and enhance production output. The tool stratification analysis in accordance with the exemplary embodiment identifies the tool(s) that has the largest contribution of variance to a process step or steps so as to identify any and all tools that may have a negative impact on, for example, process yield or functional yield. This tool(s) is then adjusted to enhance the overall functional and operational yield of the final product of the production process.

Figure 6:
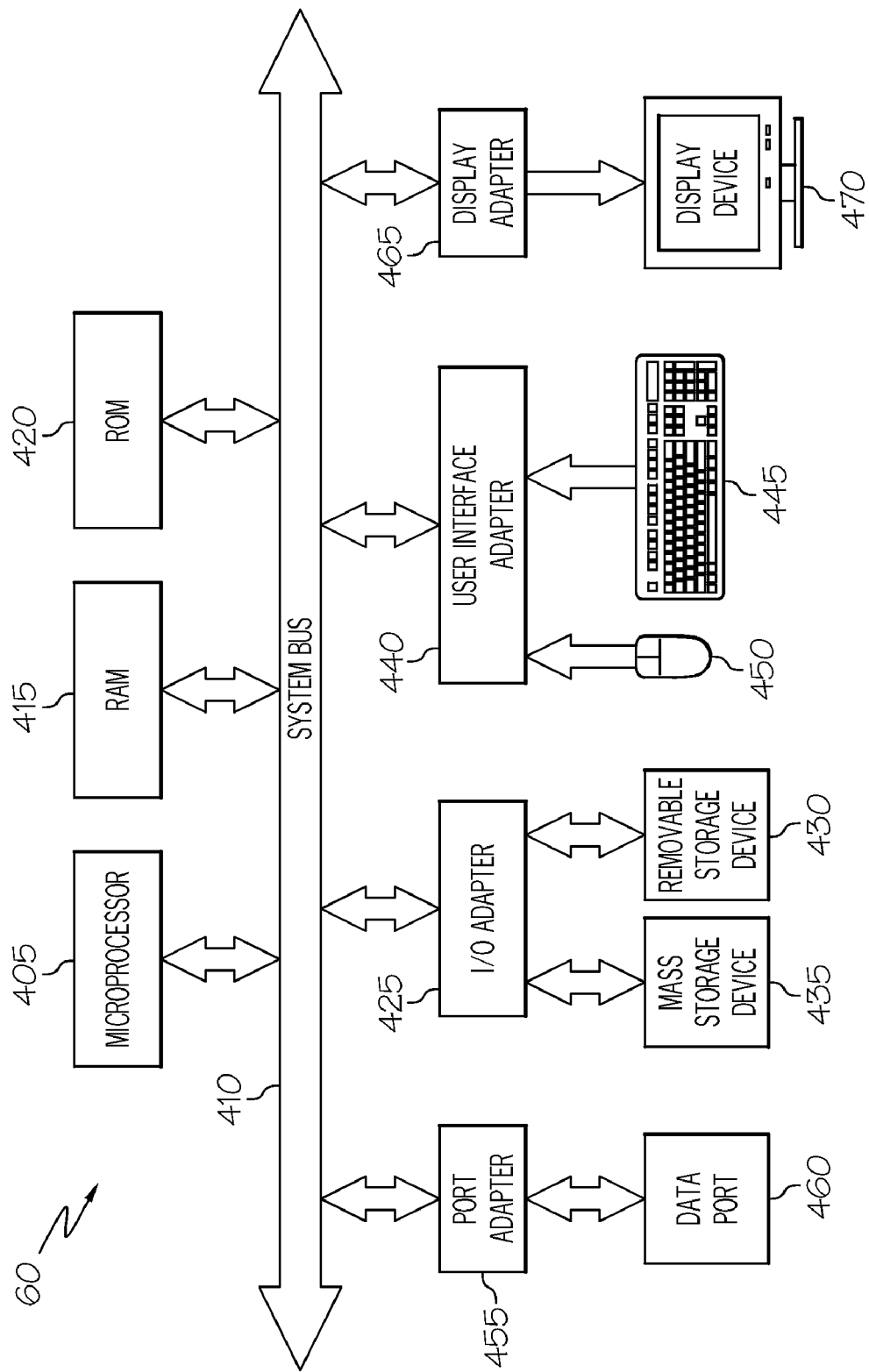
FIG. 6 is a block diagram illustrating a system for analyzing process steps in accordance with an exemplary embodiment.

Generally, the method of analyzing a production process described herein is practiced with a general-purpose computer such as indicated by command and control system 60 (FIG. 1) and the method may be coded as a set of instructions on removable or hard media for use by command and control system 60. Of course, command and control system 60 can take on a variety of forms including programmable logic controllers (PLC's) or the like. FIG. 6 is a schematic block diagram of an exemplary command and control system suitable for practicing the present invention embodiments. In FIG. 6, command and control system 60 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for command and control system 60. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of analyzing production steps to enhance a production process, the method comprising:
    inputting application data associated with at least one production process having a plurality of process steps into a memory portion of a computer, each of the plurality of process steps including a plurality of tools;
    loading process data associated with at least one of the plurality of process steps into the memory portion;
    performing a tool commonality analysis on each of the plurality of tools associated with the at least one of the plurality of process steps;
    identifying all tool-to-tool differences for the at least one of the plurality of process steps;
    performing a tool stratification analysis to identify at least one of the plurality of tools that provides the largest variance contribution to the at least one of the plurality of process steps; and
    stopping the at least one of the plurality of tools that provides the largest variance contribution to the at least one of the plurality of process steps.

2. The method of claim 1, wherein performing a tool stratification analysis includes:
    selecting one of a plurality of tools associated with one of the plurality of process steps;
    determining variance for the one of the plurality of process steps on remaining ones of the plurality of tools; and
    calculating a variance contribution for the one of the plurality of tools.

3. The method according to claim 2, further comprising: calculating a variance contribution for each of the plurality of tools.

4. The method of claim 1, wherein, inputting application data associated with at least one production process includes inputting application data associated with a plurality of production processes each having a plurality of process steps with each of the plurality of process steps including a plurality of tools.

5. The method of claim 4, further comprising:
    loading process data associated with each of the plurality of process steps for each of the plurality of production processes into the memory portion;
    performing a tool commonality analysis on each of the plurality tools for each of the plurality of process steps;
    identifying all tool-to-tool differences for each of the plurality of process steps;
    performing a cross-production process tool stratification analysis to identify one of the plurality of tools that provides the largest variance contribution to the plurality of production processes;
    removing data associated with the one of the plurality of tools that provides the largest variance contribution;
    performing another cross-production process tool stratification analysis to identify another of the plurality of tools that provides a now largest variance contribution to the plurality of process steps; and stopping the one of the plurality of tools and the another of the plurality of tools that provide the largest variance contributions to the plurality of productions processes.

6. The method of claim 1, wherein inputting application data associated with a plurality of production processes includes inputting at least one of functional yield data, and performance defect data.

7. The method of claim 1, further comprising: employing an analysis of variance (ANOVA) model to perform the tool commonality analysis.

8. The method of claim 1, further comprising: creating a statistical report associated with the tool stratification analysis.

9. The method of claim 1, further comprising: creating visual charts associated with the tool stratification analysis.

10. A system for analyzing production steps to enhance a production process, the system comprising:
a central processing unit (CPU), said CPU being interconnected functionally via a system bus to:
an input/output (I/O) adapter connecting to at least one of a removable data storage device, a program storage device, and a mass data storage device;
a user interface adapter connecting to one or more computer input devices;
a display adapter connecting to a display device; and
at least one memory device thereupon stored a set of instructions which, when executed by said CPU, causes said system to:
receive application data associated with at least one production process having a plurality of process steps into memory, each of the plurality of process steps including a plurality of tools;
load process data associated with at least one of the plurality of process steps into a memory portion;
perform a tool commonality analysis on each of the plurality of tools associated with the at least one of the plurality of process steps;
identify all tool-to-tool differences for the at least one of the plurality of process steps;
perform a tool stratification analysis to identify at least one of the plurality of tools provides the largest variance contribution to the at least one of the plurality of process steps; and
stop the at least one of the plurality of tools that provides the largest variance contribution to the at least one of the plurality of process steps.

11. The system of claim 10, wherein the set of instructions which, when executed by said CPU, causes said system to:
select one of a plurality of tools associated with one of the plurality of process steps;
determine variance for the one of the plurality of process steps on remaining ones of the plurality of tools; and
calculate a variance contribution for the one of the plurality of tools.

12. The system of claim 11, wherein the set of instructions which, when executed by said CPU, causes said system to: calculate a variance contribution for each of the plurality of tools.

13. The system of claim 10, wherein the set of instructions which, when executed by said CPU, causes said system to: input application data associated with a plurality of production processes each having a plurality of process steps with each of the plurality of process steps including a plurality of tools.

14. The system of claim 13, wherein the set of instructions which, when executed by said CPU, causes said system to:
load process data associated with each of the plurality of process steps for each of the plurality of production processes into the memory portion;
perform a tool commonality analysis on each of the plurality tools for each of the plurality of process steps;
identify all tool-to-tool differences for each of the plurality of process steps;
perform a cross-production process tool stratification analysis to identify one of the plurality of tools that provides the largest variance contribution to the plurality of production processes;
removing data associated with the one of the plurality of tools that provides the largest variance contribution;
performing another cross-production process tool stratification analysis to identify another of the plurality of tools that provides a now largest variance contribution to the plurality of process steps; and
stopping the one of the plurality of tools and the another of the plurality of tools that provide the largest variance contributions to the plurality of productions processes.

15. The system of claim 10, wherein the set of instructions which, when executed by said CPU, causes said system to: employ an analysis of variance (ANOVA) model to perform the tool commonality analysis.

16. The system of claim 10, wherein the set of instructions which, when executed by said CPU, causes said system to: create a statistical report associated with the tool stratification analysis.

17. The system of claim 10, wherein the set of instructions which, when executed by said CPU, causes said system to: create visual charts associated with the tool stratification analysis.

18. A computer program product comprising:
a non-transitory computer useable medium including a computer readable program, wherein the computer readable program when executed on a computer causes the computer to:
receive application data associated with at least one production process having a plurality of process steps into memory, each of the plurality of process steps including a plurality of tools;
load process data associated with at least one of the plurality of process steps into a memory portion;
perform a tool commonality analysis on each of the plurality of tools associated with the at least one of the plurality of process steps;
identify all tool-to-tool differences for the at least one of the plurality of process steps;
perform a tool stratification analysis to identify at least one of the plurality of tools provides the largest variance contribution to the at least one of the plurality of process steps; and
stop the at least one of the plurality of tools that provides the largest variance contribution to the at least one of the plurality of process steps.

19. The computer program product according to claim 18, wherein the computer readable program when executed on a computer causes the computer to: input application data associated with a plurality of production processes each having a plurality of process steps with each of the plurality of process steps including a plurality of tools.

20. The computer program product according to claim 19, wherein the computer readable program when executed on a computer causes the computer to:
load process data associated with each of the plurality of process steps for each of the plurality of production processes into the memory portion;

perform a tool commonality analysis on each of the plurality tools for each of the plurality of process steps;

identify all tool-to-tool differences for each of the plurality of process steps;

perform a cross-production process tool stratification analysis to identify one of the plurality of tools that provides the largest variance contribution to the plurality of production processes;

removing data associated with the one of the plurality of tools that provides the largest variance contribution;

performing another cross-production process tool stratification analysis to identify another of the plurality of tools that provides a now largest variance contribution to the plurality of process steps; and stopping the one of the plurality of tools and the another of the plurality of tools that provide the largest variance contributions to the plurality of productions processes.

* * * * *